(12) United States Patent
Han

(10) Patent No.: US 7,520,653 B2
(45) Date of Patent: Apr. 21, 2009

(54) BACKLIGHT UNIT AND LIQUID CRYSTAL DISPLAY DEVICE USING THE SAME

(75) Inventor: Jeong-Hun Han, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/636,579

(22) Filed: Dec. 11, 2006

(65) Prior Publication Data
US 2007/0285945 A1 Dec. 13, 2007

(30) Foreign Application Priority Data
Jun. 13, 2006 (KR) .................. 10-2006-0052958

(51) Int. Cl.
*F21V 7/04* (2006.01)
(52) U.S. Cl. .............. 362/614; 362/607; 362/618; 362/627; 385/901
(58) Field of Classification Search .......... 349/71; 362/606, 607, 611, 614, 618, 624, 627, 629; 385/129–132, 901
See application file for complete search history.

(56) References Cited

U.S. PATENT DOCUMENTS

| | | | | |
|---|---|---|---|---|
| 4,544,997 A * | 10/1985 | Seuter et al. ............ | 362/263 |
| 4,678,285 A * | 7/1987 | Ohta et al. ............... | 349/71 |
| 4,772,885 A * | 9/1988 | Uehara et al. ............ | 349/71 |
| 4,822,144 A * | 4/1989 | Vriens ..................... | 349/71 |
| 4,976,514 A * | 12/1990 | Murata et al. ........... | 349/71 |
| 5,666,174 A * | 9/1997 | Cupolo, III .............. | 349/64 |
| 6,348,763 B1 * | 2/2002 | Collins ................... | 313/634 |
| 6,527,414 B2 * | 3/2003 | Moon ..................... | 362/249 |
| 6,528,937 B1 * | 3/2003 | Van Gorkom .......... | 313/485 |
| 6,976,780 B2 * | 12/2005 | Lee et al. ................ | 362/622 |
| 2003/0156238 A1 * | 8/2003 | Hiraishi et al. .......... | 349/112 |
| 2004/0207995 A1 * | 10/2004 | Park et al. ............... | 362/31 |
| 2004/0228141 A1 * | 11/2004 | Hay et al. ............... | 362/555 |
| 2005/0052859 A1 | 3/2005 | Lazarev et al. .......... | 362/31 |
| 2006/0109682 A1 * | 5/2006 | Ko et al. ................. | 362/607 |

FOREIGN PATENT DOCUMENTS

JP 2002-279816 9/2002

* cited by examiner

*Primary Examiner*—John A Ward
(74) *Attorney, Agent, or Firm*—Morgan Lewis & Bockius LLP

(57) ABSTRACT

A backlight unit includes a lamp to generate and radiate an ultraviolet ray, a light guide plate including a light receiving portion to receive the ultraviolet ray, an optical sheet disposed on the light guide plate to change the ultraviolet ray into a visible ray, the optical sheet including a fluorescent material, and a reflective sheet arranged under the light guide plate.

14 Claims, 3 Drawing Sheets

BACKLIGHT UNIT AND LIQUID CRYSTAL DISPLAY DEVICE USING THE SAME

The present invention claims the benefit of Korean Patent Application No. 2006-052958 filed in Korea on Jun. 13, 2006, which is hereby incorporated by reference.

BACKGROUND OF THE INVENTION

1. Field of the Invention

The present invention relates to a liquid crystal display (LCD) device, and more particularly, to a backlight unit including a lamp that does not use fluorescent material and an LCD device using the same.

2. Discussion of the Related Art

LCD devices, which are typically regarded as non-emissive display devices, have been widely utilized in notebook and desktop computers because of the advantage of having high resolution and displaying color images with high quality. An LCD device includes an LCD module that is provided with an LCD panel for displaying images and a backlight unit for supplying light to the LCD panel. In general, the backlight unit is classified as either side type or direct type, depending on the disposition of the light source.

For example, a fluorescent lamp may be utilized as a substantial light source for a side-type backlight unit. The side type backlight unit includes the fluorescent lamp, a light guide plate, a reflective sheet under the light guide plate, and a plurality of optical sheets. Examples of the fluorescent lamp include a cold cathode fluorescent lamp (CCFL), an external electrode fluorescent lamp (EEFL), and the like. Each of the CCFL and EEFL includes a glass tube, and first and second electrodes from both end portions of the glass tube. However, although the first and second electrodes in the CCFL face each other in the glass tube, the first and second electrodes in the EEFL cover the end surfaces of the glass tube.

FIG. 1 is a schematic cross-sectional view of a fluorescent lamp according to the related art. As shown in FIG. 1, a CCFL 29 includes a glass tube 11, and first and second electrodes 19a and 19b. The glass tube 11 is provided with a mixed gas 17 having an inert gas and mercury (Hg). The first and second electrodes 19a and 19b are disposed in the glass tube 11 to receive a high voltage through both end portions of the glass tube 11. For example, the first and second electrodes 19a and 19b may be shaped like a cup in the glass tube 11. Here, the glass tube 11 also includes a passivation layer 13 and a fluorescent material layer 15 that are sequentially formed on an inner surface of the glass tube 11.

Although not shown, there are first and second lead lines extending from the first and second electrodes 19a and 19b, respectively outside the glass tube 11. When the high voltage is applied to the first and second electrodes 19a and 19b through the first and second lead lines, an electron collides with the Hg molecule of the mixed gas 17 while the electron applied to one of the first and second electrodes 19a and 19b is moved into the other of the first and second electrodes 19a and 19b. Through the process, a secondary electron is radiated and the Hg molecule is excited. Therefore, an ultraviolet (UV) ray occurs while the excited Hg molecule is restored to a stable state. The UV ray is absorbed in the fluorescent material layer 15, and then the CCFL 29 generates a visible ray.

FIG. 2 is a schematic cross-sectional view of a side type backlight unit according to the related art. Although not shown, the CCFL 29 is arranged along a lengthwise direction of a light guide plate 23. As shown in FIG. 2, the CCFL 29 is arranged adjacent to a light receiving portion LP of the light guide plate 23. A lamp guide 33 surrounds a portion of the CCFL 29, which portion does not face to the light receiving portion LP. For example, the lamp guide 33 may be shaped like "⊏" as shown in FIG. 2. The light guide plate 23 has a top surface and a bottom surface. The bottom surface has a slope such that a thickness of the light guide plate 23 is reduced from the light receiving portion LP to an opposite portion to the light receiving portion LP of the light guide plate 23.

The related-art backlight unit also includes a reflective sheet 25 disposed under the light guide plate 23. For example, the reflective sheet 25 may be a white color or a silver color. Light "L" emitted from the CCFL 29 includes a first light L1 directly entering the light receiving portion LP," and a second light L2 indirectly entering the light receiving portion LP after being reflected by the lamp guide 33 or the reflective sheet 25. The first and second lights L1 and L2 enter the light guide plate 23 through the light receiving portion LP and are diffused toward an entire surface of the light guide plate 23. And then, the first and second lights L1 and L2 are changed into a third light L3, which is a plan light passing through a plurality of optical sheets 21 on the light guide plate 23.

However, the brightness of the CCFL 29 is dependent on the flatness of the fluorescent material layer 15 (of FIG. 1). In other words, it is important to uniformly coat the fluorescent material layer 15 on the inner surface of the glass tube 11 (of FIG. 1). Thus, the process of coating the fluorescent material layer 15 becomes complicated in order to obtain the uniformly coated fluorescent material layer 15. Moreover, the brightness is reduced due to the lumping of the Hg molecule of the mixed gas 17 (of FIG. 1) and the fluorescent material layer 15. Moreover, the second light L2 of the CCFL 29 may be dissipated toward an opposite portion to the light receiving portion LP, and may partially enter the inside the CCFL 29 when it is reflected by the lamp guide 33. Thus, the second light L2 is absorbed in the fluorescent material layer 15, thereby causing a problem that the light for entering the light receiving portion LP is reduced.

SUMMARY OF THE INVENTION

Accordingly, the present invention is directed to a backlight unit and a liquid crystal display (LCD) device using the same that substantially obviate one or more of the problems due to limitations and disadvantages of the related art.

An object of the present invention is to provide a backlight unit and an LCD device using the same that provide a lamp without using fluorescent material and is capable of improving brightness and production capability.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the backlight unit includes a lamp to generate and radiate an ultraviolet ray, a light guide plate including a light receiving portion to receive the ultraviolet ray, an optical sheet disposed on the light guide plate to change the ultraviolet ray into a visible ray, the optical sheet including a fluorescent material, and a reflective sheet arranged under the light guide plate.

In another aspect, the backlight unit includes at least one lamp to generate and radiate an ultraviolet ray, an optical sheet disposed on the at least one lamp to change the ultraviolet ray into a visible ray, the optical sheet including a fluorescent material, and a reflective sheet arranged under the at least one lamp.

In another aspect, the liquid crystal display device includes a backlight unit, a liquid crystal panel including first and second substrates facing each other and a liquid crystal layer interposed between the first and second substrates, wherein the backlight unit arranged under the liquid crystal panel includes a lamp to generate and radiate an ultraviolet ray, a light guide plate including a light receiving portion to receive the ultraviolet ray, an optical sheet disposed on the light guide plate to change the ultraviolet ray into a visible ray, the optical sheet including a fluorescent material, and a reflective sheet arranged under the light guide plate.

In another aspect, the liquid crystal display device includes a backlight unit, a liquid crystal panel including first and second substrates facing each other and a liquid crystal layer interposed between the first and second substrates, wherein the backlight unit arranged under the liquid crystal panel includes at least one lamp to generate and radiate an ultraviolet ray, an optical sheet disposed on the at least one lamp to change the ultraviolet ray into a visible ray, the optical sheet including a fluorescent material, and a reflective sheet arranged under the at least one lamp.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 3A is a lamp in which electrodes are disposed inside a glass tube of the lamp, whereas FIG. 3B is a lamp in which electrodes cover the end surfaces of a glass tube;

DETAILED DESCRIPTION OF THE PREFERRED EMBODIMENTS

Reference will now be made in detail to the preferred embodiments of the present invention, examples of which are illustrated in the accompanying drawings.

Figure 1:
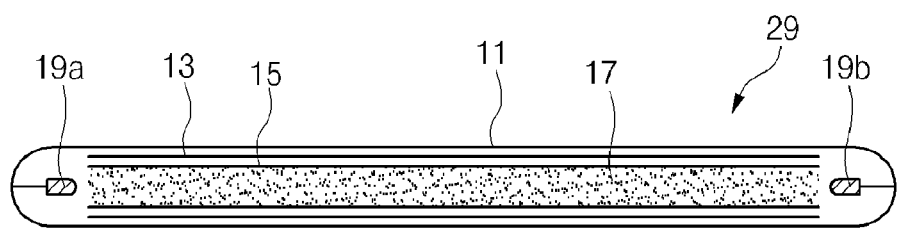
FIG. 1 is a schematic cross-sectional view of a fluorescent lamp according to the related art.
Figure 2:
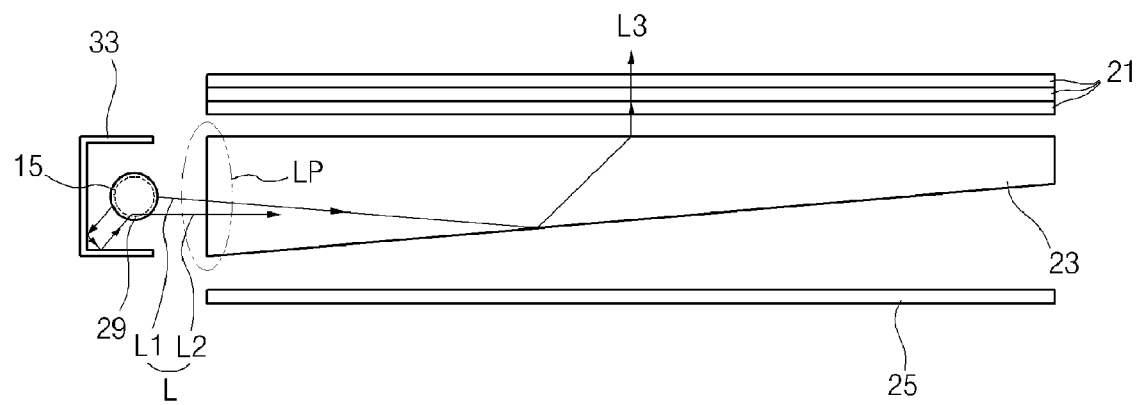
FIG. 2 is a schematic cross-sectional view of a side type backlight unit according to the related art.
Figure 3A:
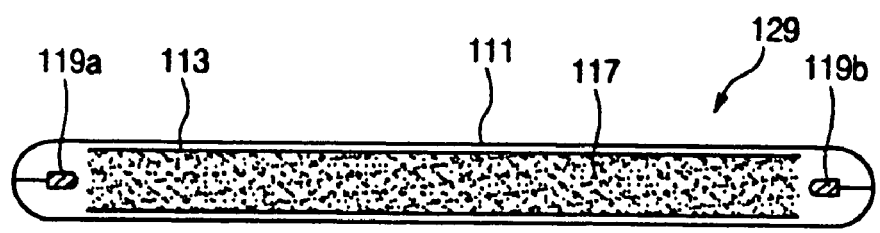
FIGS. 3A and 3B are schematic cross-sectional views of a lamp according to an exemplary embodiment of the present invention.
Figure 3B:
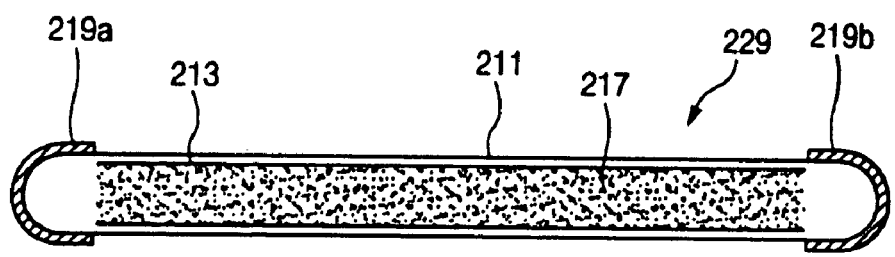

FIGS. 3A and 3B are schematic cross-sectional views of a lamp according to an exemplary embodiment of the present invention, FIG. 3A is a lamp in which electrodes are disposed inside a glass tube of the lamp, whereas FIG. 3B is a lamp in which electrodes cover the end surfaces of a glass tube.

As shown in FIG. 3A, a lamp 129 includes a glass tube 11, and first and second electrodes 119a and 119b that receive an appropriate voltage. For example, the appropriate voltage may be a high voltage. The glass tube 111 may be provided with a mixed gas 117 having an inert gas and Hg. The glass tube 111 includes a passivation layer 113 formed on an inner surface of the glass tube 111 to prevent the mixed gas from invasion of ions and impurities into the glass tube 111. For example, the first and second electrodes 119a and 119b may be shaped like a cup. Although not shown, there are first and second lead lines extending from the first and second electrodes 119a and 119b to apply the appropriate voltage to the lamp 129 outside the glass tube 111, respectively.

As shown in FIG. 3B, a lamp 229 includes a glass tube 211, and first and second electrodes 219a and 219b. Here, the first and second electrodes 219a and 219b may be disposed at both the end portions of the glass tube 211, respectively. Specifically, the first and second electrodes 219a and 219b cover the end surfaces of the glass tube 211. Similar to the glass tube 111 (of FIG. 3A), the glass tube 211 is provided with a mixed gas 217 having an inert gas and Hg. The glass tube 211 includes a passivation layer 213 formed on an inner surface of the glass tube 211. It is noted that there is no a fluorescent material layer formed on both the glass tube 211 and the glass tube 111 (of FIG. 3A).

When the appropriate voltage is applied to the lamp 129 (or 229) through the first and second electrodes 119a and 119b (or 219a and 219b), an electron collides with Hg molecule of the mixed gas 117 (or 217), while the electron applied to one of the first and second electrodes 119a and 119b (or 219a and 219b) is moved into the other of the first and second electrodes 119a and 119b (or 219a and 219b). Therefore, a secondary electron is radiated and the Hg molecule is excited. Next, an ultraviolet ray is generated by the lamp 129 (or 229) while the excited Hg molecule is restored to a stable state.

Figure 4:
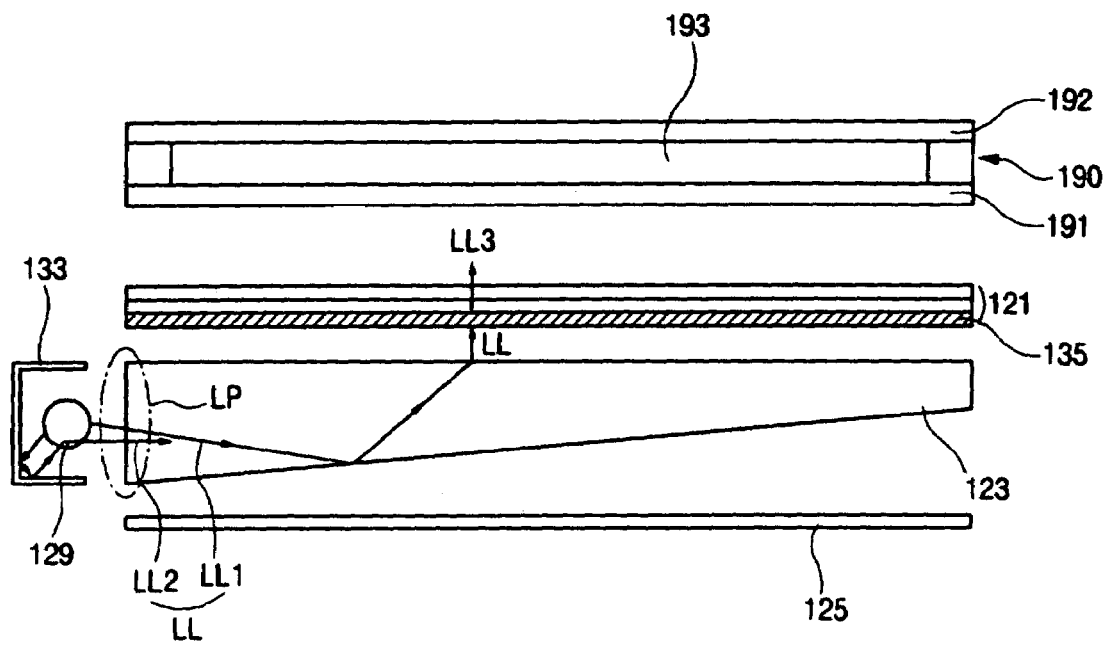
FIG. 4 is a schematic cross-sectional view of a side type backlight unit according to an exemplary embodiment of the present invention.

FIG. 4 is a schematic cross-sectional view of a side type backlight unit according to an exemplary embodiment of the present invention. As shown in FIG. 4, a side type backlight unit includes a lamp 129 without using a fluorescent material layer, a light guide plate 123 having a light receiving portion LP. Although not shown, the lamp 129 is arranged along a lengthwise direction of the light receiving portion LP. The backlight unit also includes a lamp guide 133 surrounding a portion of the lamp 129, which portion does not face to the light receiving portion LP. The lamp guide 133 serves to reflect light from the lamp 129 toward the light receiving portion LP. For example, the lamp guide 133 may be a white color or a silver color and may be shaped like ""⌞"" as shown in FIG. 4. Thus, the lamp guide 133 is opened in a portion corresponding to the light receiving portion LP. Moreover, a reflective sheet 125 is disposed under the light guide plate 123 to reflect light from a bottom surface of the light guide plate 123. A liquid crystal panel 190 is arranged over the backlight unit and includes first and second substrates 191 and 192 facing each other and a liquid crystal layer 193 interposed between the first and second substrates 191 and 192.

The light guide plate 123 includes a top surface and a bottom surface. Here, the bottom surface has a slope such that a thickness of the light guide plate 123 is reduced from the light receiving portion LP to an opposite portion to the light receiving portion LP. Further, a plurality of optical sheets 121 are disposed on the light guide plate 123. One of the plurality of optical sheets 121 may include a fluorescent material, and the one optical sheet including the fluorescent material is defined as a fluorescent optical sheet 135.

The lamp 129 emits light LL such as the ultraviolet ray, which may include a first light LL1 directly entering the light receiving portion LP and a second light LL2 indirectly entering the light receiving portion LP. The second light LL2 enters the light receiving portion LP after being radiated toward the lamp guide 133 and being reflected from the lamp guide 133. The incident light LL in the light guide plate 123 is substantially reflected for several times and is diffused toward an entire surface of the light guide plate 123. And then, the incident light LL in the light guide plate 123 is radiated toward the fluorescent optical sheet 135. At this time, the incident light LL, which is the ultraviolet ray, is changed into a third light LL3 through the fluorescent optical sheet 135 when the ultraviolet ray is absorbed by the fluorescent material of the fluorescent optical sheet 135. The third light LL3 is a visible ray such as a plan light, which is provided to an LCD panel (not shown) disposed over the optical sheets 121. That is, the first and second lights LL1 and LL2 are the ultraviolet rays, whereas the third light LL3 is the visible ray. According to the exemplary embodiment, the lamp 129 generates and radiates the ultraviolet ray without using the fluorescent material, and the ultraviolet ray is changed into the visible ray by the fluorescent material included in the optical sheets, and is modified as the plan light.

The fluorescent optical sheet 135 may be formed by directly spraying or by dipping. Alternatively, the fluorescent material may include a material of the fluorescent optical sheet 135. The light guide plate 123 may further include an additive (not shown) for preventing yellowing due to thermalization of the light guide plate 123 by the ultraviolet ray having a specific range. That is, the ultraviolet ray generally has a range of 40 nm to 380 nm and the additive should absorb the ultraviolet ray having a range of 300 nm to 380 nm that causes the yellowing phenomenon. For example, the additive may be coated on a surface of the light guide plate 123 adjacent to the lamp 129 or may be added during a process of forming the light guide plate 123.

Although not shown, the lamp 129 may be an external electrode type lamp in which the first and second electrodes respectively cover the end surfaces of the glass tube. Alternatively, the side type backlight unit according to the exemplary embodiment of the present invention may include two lamps respectively disposed so that the two lamps are respectively adjacent to both the end portions of the light guide plate 123.

Figure 5:
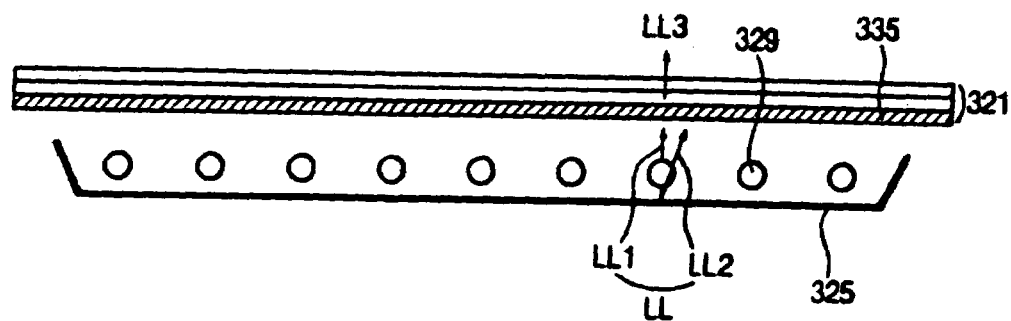
FIG. 5 is a schematic cross-sectional view of a direct type backlight unit according to an exemplary embodiment of the present invention.

FIG. 5 is a schematic cross-sectional view of a direct type backlight unit according to an exemplary embodiment of the present invention. As shown in FIG. 5, the direct type backlight unit includes a plurality of lamps 329 arranged parallel to each other, a reflective sheet 325 under the plurality of lamps 329, and a plurality of optical sheets 321 disposed on the plurality of lamps 329. The plurality of optical sheets 321 include a fluorescent optical sheet 335 that includes the fluorescent material. The plurality of optical sheets 321 may further include an additive (not shown) capable of adsorbing the ultraviolet ray of a range of 300 nm to 380 nm that causes yellowing. Alternatively, the additive may be added during the process of forming the optical sheet 321.

According to the present invention, the backlight unit includes the lamp radiating the ultraviolet ray without using the fluorescent material, the light guide plate in which the ultraviolet ray from the lamp is incident, and the plurality of optical sheets including the fluorescent material. Accordingly this arrangement of the exemplary embodiments, forming the fluorescent material layer is simple and brightness uniformity is improved because there is no process of forming the fluorescent material layer in the inner surface of the glass tube, thereby improving the productivity efficiency. Further, since the fluorescent material is not formed inside the lamp, the problem such as the lumping of the fluorescent material and the Hg molecule will not occur and therefore brightness deterioration can be prevented. Furthermore, the light entering the lamp does not suffer a loss because the fluorescent material is not formed inside the lamp, thereby improving light efficiency.

It will be apparent to those skilled in the art that various modifications and variations can be made in the backlight unit and liquid crystal display device using the same of the present invention without departing from the spirit or scope of the invention. Thus, it is intended that the present invention covers the modifications and variations of this invention provided they come within the scope of the appended claims and their equivalents.

What is claimed is:

1. A backlight unit, comprising:
a lamp to generate and radiate an ultraviolet ray;
a light guide plate including a light receiving portion to receive the ultraviolet ray;
an optical sheet disposed on the light guide plate to change the ultraviolet ray into a visible ray, the optical sheet including a fluorescent material;
a reflective sheet arranged under the light guide plate; and
an additive added in the light guide plate to absorb ultraviolet rays with a wavelength range of 300 nm to 380 nm,
wherein the backlight unit supplies the visible ray to a liquid crystal panel.

2. The backlight unit according to claim 1, wherein the lamp includes a glass tube and a passivation layer disposed on an inner surface of the glass tube.

3. The backlight unit according to claim 2, wherein the lamp further includes first and second electrodes extending from end portions of the glass tube, the first and second electrodes facing each other in the glass tube.

4. The backlight unit according to claim 2, wherein the lamp further includes first and second electrodes that are disposed at end portions of the glass tube, and respectively cover end surfaces of the glass tube.

5. The backlight unit according to claim 1, wherein the light guide plate includes a top surface and a bottom surface, the bottom surface is adjacent to the reflective sheet and slopes gradually from the light receiving portion to an opposite portion to the light receiving portion.

6. The backlight unit according to claim 1, wherein the optical sheet includes a plurality of optical sheets, one of which includes the fluorescent material.

7. The backlight unit according to claim 1, wherein the fluorescent material is formed on a surface of the optical sheet.

8. The backlight unit according to claim 1, wherein the optical sheet includes the fluorescent material as one of materials forming the optical sheet.

9. The backlight unit according to claim 1, further comprising a lamp guide surrounding the lamp except a portion of the lamp facing the light receiving portion.

10. The backlight unit according to claim 9, wherein the lamp guide is "⊏"-shaped.

11. The backlight unit according to claim 9, wherein the reflective sheet reflects the ultraviolet ray toward the light guide plate.

12. The backlight unit according to claim 1, wherein the lamp is provided with a mixed gas including an inert gas and mercury (Hg).

13. A liquid crystal display device, comprising:
a liquid crystal panel including first and second substrates facing each other and a liquid crystal layer interposed between the first and second substrates; and
a backlight unit arranged under the liquid crystal panel, the backlight unit including:

a lamp to generate and radiate an ultraviolet ray;

a light guide plate including a light receiving portion to receive the ultraviolet ray;

an optical sheet disposed on the light guide plate to change the ultraviolet ray into a visible ray, the optical sheet including a fluorescent material;

a reflective sheet arranged under the light guide plate; and an additive added in the light guide plate to absorb ultraviolet rays with a wavelength range of 300 nm to 380 nm.

14. The liquid crystal display device according to claim 13, wherein the lamp is provided with a mixed gas including an inert gas and mercury (Hg).

* * * * *